March 23, 1937.  L. RICEFIELD  2,074,940
COUPLING
Filed Dec. 28, 1935
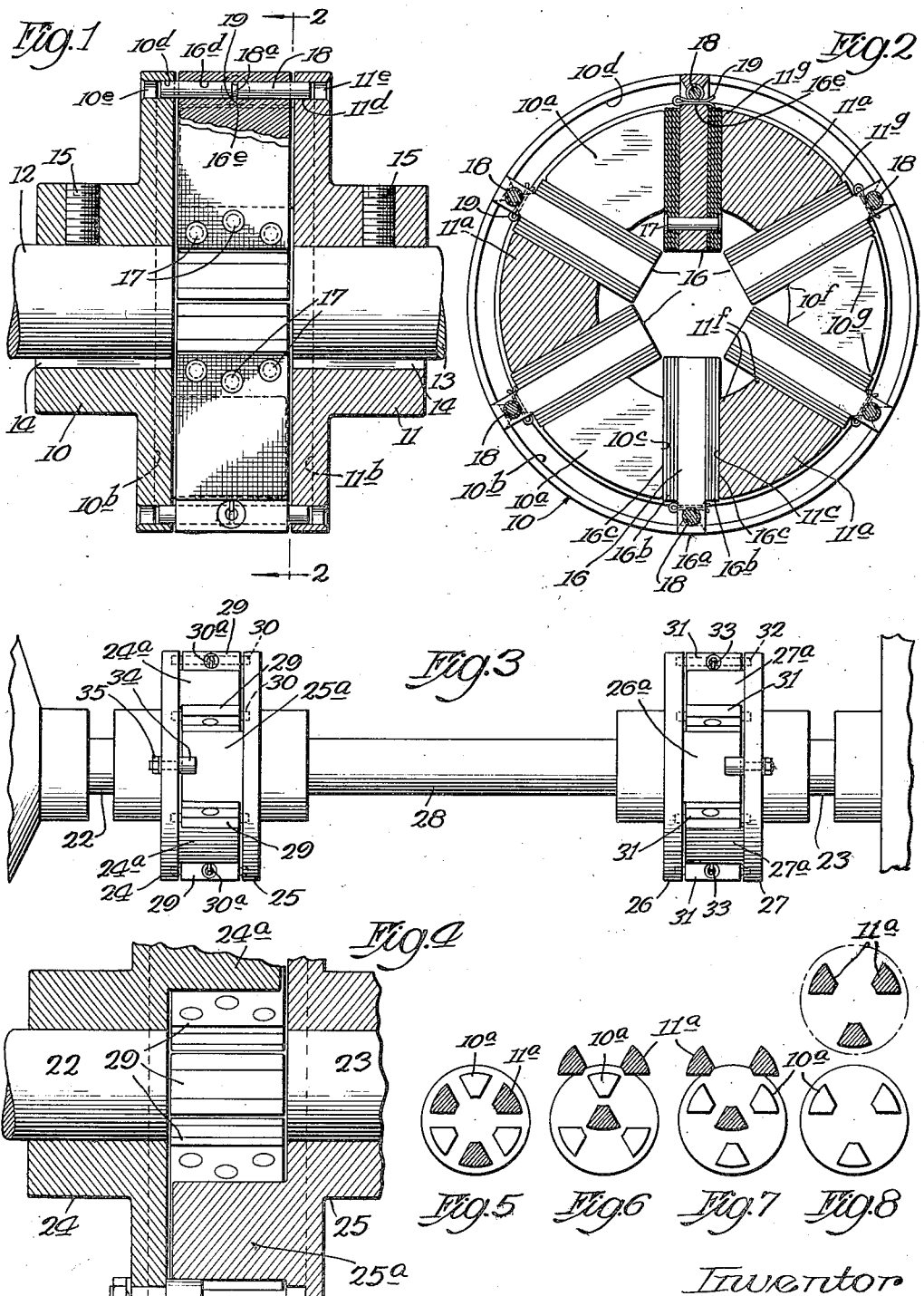
Inventor
Louis Ricefield
By Davis, Macauley, May, Lindsey & Smith, Attys.

Patented Mar. 23, 1937

2,074,940

UNITED STATES PATENT OFFICE 2,074,940

COUPLING

Louis Ricefield, Oak Park, Ill.

Application December 28, 1935, Serial No. 56,521

8 Claims. (Cl. 64—14)

This invention relates to improvements in couplings and its purpose is to provide an improved device for connecting two substantially aligned shafts in order to compensate for angular misalignment, relative lateral displacement or relative endwise movement of said shafts. The purpose of the invention is to provide an improved coupling of that type in which a pair of coupling members, each adapted to be secured upon one of the substantially aligned shafts, are provided with longitudinally extending lugs or jaws adapted to intermesh loosely with each other and adapted to receive between them a plurality of separate individual power transmitting members, preferably formed partly or wholly of resilient compressible material, which are adapted to be compressed when forces are transmitted from one coupling member to the other.

The principal object of the present invention is to provide an improved coupling of the type referred to embodying improved means for detachably holding the power transmitting members in place between the lugs or jaws of the opposite coupling members. A further object of the invention is to provide an improved coupling comprising a pair of coupling members provided with longitudinally extending lugs or jaws intermeshing loosely with each other and receiving between them a plurality of separate power transmitting members, in combination with retaining pins which detachably engage apertures in the power transmitting members and aligning apertures in outwardly extending portions of the coupling members so that these pins may be readily inserted or withdrawn when desired to permit the removal and replacement of power transmitting members when desired. Still another object is to provide an improved coupling of the type referred to comprising power transmitting members provided with apertures located outside of their areas of contact with the lugs or jaws of the coupling members, in combination with retaining pins which are detachably secured in said apertures and which have projecting ends loosely engaging annular grooves which are formed in the faces of the coupling members, these coupling members being provided at intervals with oppositely disposed apertures adapted to permit the pins to be inserted and withdrawn when desired. A further object of the invention is to provide an impoved coupling device comprising a plurality of pairs of coupling members each having longitudinally extending lugs or jaws to intermesh loosely with the other coupling member of the same pair, in combination with a plurality of resilient compressible power transmitting members each contacting with two lugs or jaws carried by opposing coupling members and each retained in place by a pin detachably engaging the power transmitting member and parts of the two adjacent coupling members. Another object of the invention is to provide an improved coupling comprising a pair of coupling members having longitudinally extending intermeshing jaws and intermediate power transmitting blocks wherein the jaws of one member may be passed between the jaws of the other member, after the power transmitting blocks have been removed, thus allowing the coupling members to be separated by relative movement transversely to their axes of rotation. Other objects relate to various features of construction and arrangement which will appear more fully hereinafter.

The nature of the invention will be understood from the following specification taken with the accompanying drawing in which two embodiments are illustrated.

In the drawing,

Figure 1 shows a longitudinal axial section through a coupling embodying the improved features of the present invention;

Fig. 2 shows a sectional view taken on the line 2—2 of Fig. 1;

Fig. 3 shows a side elevation of a modified form of the invention in which two substantially aligned shafts are connected by a plurality of pairs of coupling members and their coacting power transmitting members and by an intermediate shaft to which two of the coupling members are attached;

Fig. 4 shows an enlarged radial section through two of the coupling members embodied in the form of construction illustrated in Fig. 3;

Fig. 5 shows somewhat diagrammatic sectional view, similar to that of Fig. 2, with the power transmitting members removed, illustrating the relative positions of two coupling members before they are separated by relative movement transversely to their axes.

Fig. 6 is a view similar to that of Fig. 5 showing the relative positions of the jaws of two coupling members at the end of the initial stage of their separating movement in a plane extending transversely to their axes;

Fig. 7 is a sectional view similar to that of Fig. 6 showing the relative positions of the parts after further movement in an angular direction of the lower coupling member in order to position a lug or jaw on the upper coupling member in a position to pass between two lugs or jaws on the lower coupling member; and Fig. 8 shows the relative positions of the two coupling members after they have been completely separated by relative movement transversely to their axes of rotation.

As illustrated in Figs. 1 and 2 of the drawing, the invention is embodied in a coupling comprising a pair of coupling members 10 and 11 which are adapted to be secured upon a pair of substantially aligned shafts 12 and 13, respectively, by means of keys 14 and set screws 15. The coupling member 10 comprises a plurality of longitudinally extending jaws 10$^a$ which are adapted to intermesh loosely with a plurality of similar lugs or jaws 11$^a$ which are formed on the outer coupling member 11. The coupling members are provided with outwardly extending disc portions 10$^b$ and 11$^b$ from which the lugs or jaws 10$^a$ and 11$^a$, respectively, project and these lugs or jaws are adapted to receive between them the power transmitting members 16 which are in the form of separate blocks, preferably formed partly or wholly of resilient material, which are mounted independently of each other and supported by the coupling members.

The power transmitting member 16 is in the form of a block made up of a plurality of layers or laminations including a central member 16$^a$ and two outside layers or laminations 16$^b$. All of these layers or laminations may be formed of resilient material, such as rubber, rubberized duck, leather, or the like, but, as now advised, it is preferable to form the outer layers 16$^b$ of such resilient materials and to form the central layer 16$^a$ of steel or other hard metal. The blocks 16 are provided with opposite surfaces 16$^c$ which are adapted to coact with the surfaces 10$^c$ and 11$^c$ which are formed on the lugs or jaws of the coupling members. In the embodiment illustrated, the surfaces 16$^c$ of each block are shown as extending parallel to each other and parallel to a plane containing the axis of rotation of the coupling members, but, if desired, these surfaces may be made to diverge outwardly along straight or curved lines, and the contacting surfaces of the lugs or jaws may be similarly formed, as described and claimed in my copending application, Serial No. 739,419, filed August 11, 1934 now matured into Patent No. 2,025,827 issued December 31, 1935. The power transmitting members 16 extend inwardly beyond the contacting faces of the lugs or jaws 10$^a$ and 11$^a$ and rivets 17 extend through these inwardly extending parts for securing the laminations together. Other securing means may be employed if desired, but if metallic securing means, such as the rivets 17 are employed, it is desirable that they be located, as illustrated, outside of the areas of contact of the power transmitting members with the lugs or jaws of the coupling members. The fastening means are thus not subjected to compression when forces are transmitted from one coupling member to the other.

For the purpose of retaining the power transmitting members 16 in place between the lugs or jaws of the coupling members, the intermediate layers or laminations 16$^a$ are extended outwardly beyond the outer layers 16$^b$ and these projecting portions are provided with longitudinally extending bores or apertures 16$^d$ which are adapted to be engaged by the retaining pins 18. These pins are of such length that their ends project beyond the ends of the power transmitting members 16 to engage annular grooves 10$^b$ and 11$^b$ which are formed in the inner faces of the disc portions of the coupling members 10 and 11, respectively. These disc portions 10$^b$ and 11$^b$ are provided with apertures 10$^e$ and 11$^e$, respectively, which are adapted to align with the apertures 16$^d$ in the power transmitting members to permit the insertion or withdrawal of the pins 18. For the purpose of holding the retaining pins 18 in place after they have been inserted, the central laminations 16$^a$ of the power transmitting members are provided with transversely extending apertures 16$^e$ which intersect the longitudinal apertures 16$^d$ and which are adapted to be engaged by cotter pins 19 which engage annular grooves 18$^a$ formed in the pins 18 midway between their ends. After these cotter pins have been inserted, their ends are spread apart and they then prevent endwise movement of the pins 18 which project into the grooves 10$^d$ and 11$^d$ which are loosely fitted by them so that the power transmitting members 16 are permitted to have a free floating movement with respect to the coupling members so that they may adjust themselves to angular misalignment, lateral displacement and relative endwise movement of the shafts. If one of the power transmitting members becomes worn or defective after long continued use, it may be readily removed, independently of the others, by detaching its cotter pin 19 and then removing its retaining pin 18, which may be done by driving a suitable pin through one of the aligning apertures in the disc of the coupling members and driving out the retaining pin. The retaining pins 18 retain the power transmitting member 16 against radial movement in either direction and they are located outside of the areas of contact of the power transmitting members with the lugs or jaws so that the portions of the member 16 which are engaged by the pins 18 are not subjected to compressive stress when forces are transmitted from one coupling member to the other.

An important feature of this invention is the construction of the lugs or jaws on the coupling members 10 and 11 in such a way that the space between the inner corners 10$^f$ of two lugs carried by one coupling member is greater than the width measured between the outer corners 11$^g$ of the other coupling member, while the space between the inner corners 11$^f$ of said other coupling member is greater than the space or distance between the outer corners 10$^g$ of the first mentioned coupling member. This permits the removal of one coupling member from its intermeshing relation to the other coupling member by movement radially, transversely to the axis of rotation of the coupling, which may be desirable where the space is limited and the two coupling members may not be separated longitudinally of the shafts upon which they are mounted, although one of the shafts is capable of movement endwise to permit outward movement of the coupling member mounted thereon. This mode of separation of the coupling members is illustrated somewhat diagrammatically in Figs. 5, 6, 7 and 8. In Fig. 5 the two coupling members are shown in a sectional view, similar to that of Fig. 2, with the intermediate power transmitting members withdrawn. The first step of the operation of removal is shown in Fig. 6 where the coupling member 11 has been elevated, causing two of the jaws 11$^a$ to be passed on opposite sides of the upper jaw 10$^a$, while the lower jaw 11$^a$ occupies a position coincident with the axis of the coupling member 10. In order to permit continued movement of the coupling member 11, carrying the jaws 11a, the lower coupling member 10 is then rotated to bring it to the position shown in Fig. 7, wherein the two uppermost jaws 10a occupy positions which then allow the lower jaw 11a to be moved further in a vertical direction as the elevation of the coupling member 11 continues to the point shown in Fig. 8, where the two coupling members are entirely separated. This improvement has been illustrated in connection with a coupling having power transmitting members whose opposite jaw-engaging faces are parallel to each other, but it will be apparent that this advantage may be even more readily gained in a coupling of the type disclosed in my applications above referred to wherein the outwardly extending lug-engaging faces of the power transmitting members diverge from each other.

In Figs. 3 and 4 of the drawing there is illustrated a modification of the invention wherein a plurality of pairs of coupling members and their coacting power transmitting members are embodied in one unit. In this modification, the two shafts to be connected are designated at 22 and 23 and they are connected by two pairs of coupling members 24 and 25 and 26 and 27, together with an intermediate short shaft 28 on which the two coupling members 25 and 26 are secured. The two coupling members 24 and 25 which are secured upon the two shafts 22 and 28, respectively, are provided with longitudinally extending lugs or jaws 24a and 25a, respectively, which receive between them the power transmitting members 29 which are similar in form and construction to those previously described, being secured in place by retaining pins 30 held in position by cotter pins 31. The coupling members 26 and 27, which are secured upon the shafts 28 and 23, respectively, are similarly provided with longitudinally extending lugs or jaws 26a and 27a which are adapted to receive between them the contacting power transmitting members 31, similar in form and construction to those shown in Fig. 2 and retained in place by pins 32 held in position by cotter pins 33. In order to prevent excessive lateral displacement of the shaft 28 and of the two coupling members 25 and 26 mounted thereon, after a considerable degree of wear of the power transmitting members 29 and 31, the radial disc of each of the coupling members 24 and 27 is provided with three or more retaining pins 34 which overlap three of the lugs or jaws 25a and 26a formed on the intermediate coupling members 25 and 26, respectively, so that excessive lateral movement of these coupling members is prevented by their engagement with these members 34 which have stems extending through the discs of the coupling members on which they are mounted to be held in place by nuts 35 engaging their threaded ends. This form of construction has the advantage that it permits a great degree of flexibility and this allows an efficient operative connection to be made between the two shafts 22 and 23 when there is a great degree of lateral displacement of these shafts.

Although certain forms of the invention have been shown and described by way of illustration, it will be understood that it may be constructed in various other embodiments which come within the scope of the appended claims.

I claim:

1. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power transmitting members each interposed between and contacting with two of said jaws carried by opposite coupling members, and retaining pins mounted in said power transmitting members and loosely interlocking with both of said coupling members.

2. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power transmitting members each interposed between and contacting with two of said jaws carried by opposite coupling members, and retaining pins each detachably mounted in one of said power transmitting members and loosely interlocking with both of said coupling members.

3. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power transmitting members each interposed between and contacting with two of said jaws carried by opposite coupling members, and a plurality of retaining pins each secured in one of said power transmitting members with its ends projecting therefrom, said coupling members being provided with grooves loosely engaged by the ends of said pins.

4. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power transmitting members each interposed between and contacting with two of said jaws carried by opposite coupling members, and a plurality of retaining pins each detachably mounted in one of said power transmitting members outside of the areas of contact of said power transmitting members with said jaws, said coupling members being each provided with means for receiving the ends of said pins to hold said power transmitting members in place between said jaws.

5. The combination in a coupling for connecting substantially aligned shafts, of a pair of coupling members each adapted to be secured upon a separate one of said shafts, each of said coupling members being provided with a plurality of longitudinally extending jaws adapted to intermesh loosely with the jaws carried by the other coupling member, a plurality of power transmitting members comprising compressible resilient parts interposed between and contacting with two of said jaws carried by opposite coupling members, said power transmitting members comprising parts extending beyond the areas of contact of their surfaces with said jaws, said parts being provided with apertures therethrough, and retaining pins engaging said apertures and interlocking with both of said coupling members.

6. The combination in a coupling for connecting substantially aligned shafts, of a pair of coupling members each adapted to be secured upon a separate one of said shafts, each of said coupling members being provided with a plurality of longitudinally extending jaws adapted to intermesh loosely with the jaws carried by the outer coupling member, a plurality of power transmitting members comprising compressible resilient parts interposed between and contacting with two of said jaws carried by opposite coupling members, said power transmitting members comprising parts extending beyond the areas of contact of their surfaces with said jaws, said parts being provided with apertures therethrough, and retaining pins each detachably engaging one of said apertures in one of said power transmitting members, said coupling members being provided with annular grooves to receive the ends of said pins.

7. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power transmitting members each interposed between and contacting with two of said jaws carried by opposite coupling members, and means for detachably retaining said power transmitting members between said jaws, said jaws being so arranged on the coupling members and the spaces between the jaws being so proportioned that after the removal of the power transmitting members there will be at least one radial direction in which the intermeshing jaws may clear each other when their respective coupling members are moved relatively in that direction.

8. The combination in a coupling for connecting two substantially aligned shafts, of a pair of coupling members each adapted to be secured upon a separate one of said shafts, each of said coupling members comprising a plurality of longitudinally extending jaws adapted to intermesh loosely with the jaws carried by the other coupling member, a plurality of power-transmitting members each interposed between and contacting with two of said jaws carried by opposite coupling members, and a plurality of retaining pins each detachably secured in one of said power transmitting members with its ends projecting therefrom, said coupling members being provided with a plurality of apertures extending therethrough and adapted to align with each other in opposite coupling members in pairs for engagement by the projecting ends of said pins.

LOUIS RICEFIELD.